United States Patent Office 3,499,571
Patented Mar. 10, 1970

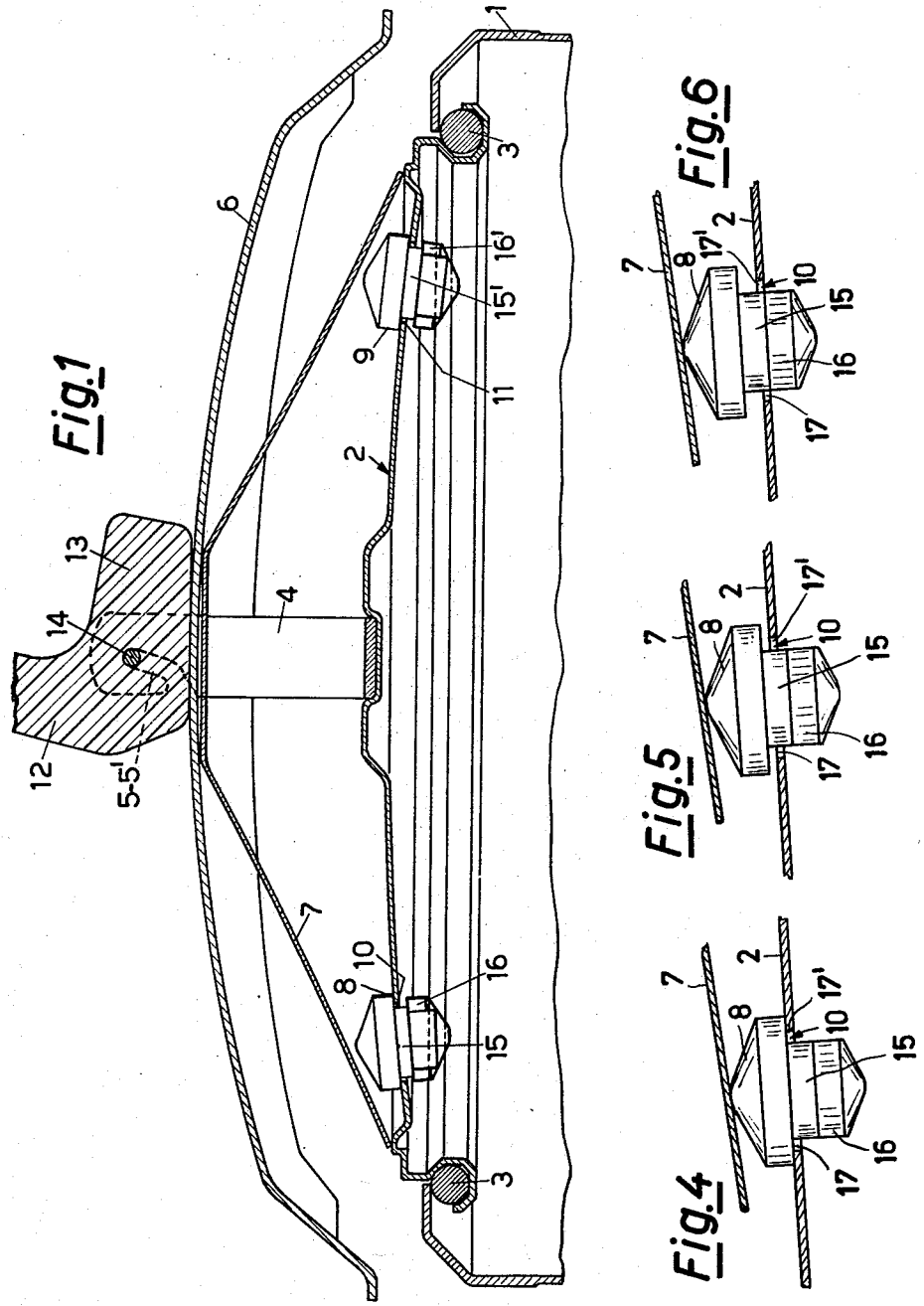

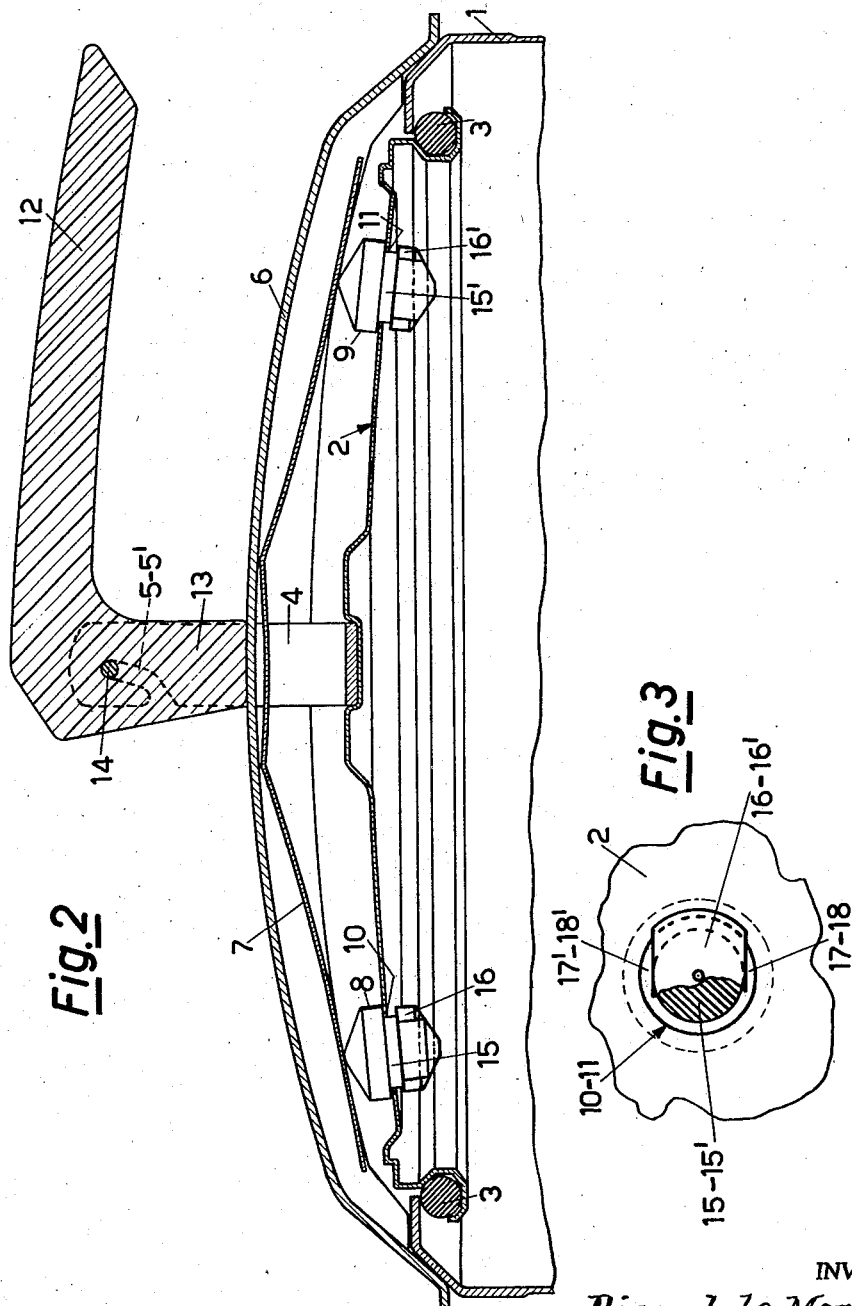

3,499,571
PRESSURE COOKER HAVING A SEALTIGHT OVAL LID ABUTTING THE INNER EDGE OF SAID COOKER
Pieraldo Mortara, Vercelli, Italy, assignor to Sambonet S.p.A., Vercelli, Italy, a company of Italy
Filed Apr. 8, 1968, Ser. No. 719,502
Claims priority, application Italy, Apr. 14, 1967, 14,946/67, Patent 791,595
Int. Cl. B65d 45/02
U.S. Cl. 220—25                                6 Claims

ABSTRACT OF THE DISCLOSURE

A pressure cooker is disclosed, in which a resilient elongated body is used to compress two plugs acting both as safety valves and venting means for discharging steam prior to opening the cooker. The lid is of substantially planar configuration and acts as a resilient diaphragm capable of signalling the approximate value of the steam pressure. The shape of the plugs is also such as to signal when the plugs themselves are incorrectly mounted.

---

Pressure cookers are known which are equipped with a rigid oval lid to introduce into the cooker and, which, by being rotated through a quarter of a revolution, gives rise to a complete juxtaposition of its edge to the inner edge of the cooker, a sealtight gasket being inserted between said two edges. In such a cooker, the initial sealtightness is obtained by a cross-beam which rests against the outer surface of the cooker and by an eccentric lever which, by acting upon a specially provided stirrup piece integral with the lid, approaches the latter to the cross-beam and causes it to stick to the inner edge of the cooker. Sealtightness is further ensured by the pressure of the steam being generated in the interior of the cooker. Said conventional cookers are usually equipped with whistle vents so as to signal by a sound that the preselected pressure has been attained and with other devices for purging out the steam prior to opening the cooker.

The subject matter of the present invention is a pressure cooker of the kind referred to above, in which both the signalling of the pressure value and the reliability in service, along with the discharge of steam prior to opening are obtained with means which are simultaneously simpler and more reliable than those provided by the prior art.

The subject cooker is characterized, in fact, in that between the cross-beam and the lid, one or more resilient member(s) is inserted which, by exerting a pressural force against two rubber plugs, threaded and slidable in special holes formed through the lid, fulfils the twofold task of keeping the cross-beam away of the lid so as to facilitate the introduction of the lid into the cooker, and of providing the mechanical load which is necessary for the plugs to perform their action as safety valves. Preferably, said resilient member consists of a leaf spring, whose central portion rests against the cross-beam and whose free ends press the two rubber plugs.

One of the advantages afforded by such an arrangement of parts is due to the fact that the discharge of steam, to be carried out prior to opening the cooker, is obtained by manipulating the same eccentric lever which is used to close the cooker. As a matter of fact, by manipulating said lever for starting the opening operation, the load exerted by the spring on the two plugs is annulled or nearly so, the plugs then allowing, as they are lifted, the thorough discharge of steam prior to turning and removing the lid.

Another feature of the subject cooker is that the lid has a substantially planar shape and is resiliently deformable, so that it behaves like the wall of a manometric capsule which is sensitive to the pressure of the steam evolved within the cooker, so that said pressure can be easily indicated to the outside also as a function of said deformation. According to a preferred embodiment the manipulating lever itself, shaped as a bell-crank lever and with the handle placed in a nearly horizontal posture, can act as a signalling means. As a matter of fact, as the pressure is increased and the lid is approached to the cross-beam and lifts the stirrup to which the lever is pivotally connected, the handle of the lever is allowed to rotate and is lowered due to its own weight.

The foregoing and other features are more clearly seen in an embodiment illustrated by way of example in the accompanying drawings, wherein:

FIGURE 1 is a cross-sectional view of the cooker with the lid applied but still in the opened position, FIGURE 2 is the same cross-sectional view of FIG. 1, but the lid is in closed position, FIGURE 3 is a detailed view from bottom of the plug inserted into a perforation of the lid, and FIGURES 4, 5, 6 show the several positions of the plug.

The pressure cooker illustrated herein comprises the cooker body 1 with an oval port into which is introduced, and then turned, the oval lid 2. The latter, as in the conventional types, is intended to provide a tight seal by the agency of a gasket 3 along the inner edge of the body 1. At the end of the lid 2 is affixed a stirrup piece 4, having the shape of a U, whose two parallelly spaced apart prongs have hooked slots 5–5'.

Between the two prongs of the stirrup, a cross-beam 6 is slipped and, between the cross-beam 6 and the lid 2 a leaf spring 7 is inserted. The latter rests with its central portion against the cross-beam and is intended to rest with its own two free ends against two rubber plugs 8 and 9, these latter being mounted into two circular bores 10–11 formed through the lid 2.

A two-arm manipulating lever 12–13, whose arms are roughly perpendicular to one another, has a transversal pin 14 which projects from the two sides of the lever and is introduced into the slots 5–5' of the stirrup so as to contact the bottom of the slots and acts as a pivotal point for the manipulating lever.

When the lid is still in the opening position (FIG. 1) the arm 12 of the manipulating lever is roughly vertical and the arm 13 nearly horizontal, while the spring 7 keeps the cross-beam definitely spaced apart from the lid and thus facilitates the introduction of the latter into the cooker. On the contrary, once that the lid has been introduced and turned through 90° approximately so as to bring the gasket 3 beneath the inner edge of the cooker and all along it, it suffices that the manipulating lever 12–13 is rotated through 90° approximately so that the arm 13 causes the lid to be approached to the cross-beam, thus compressing the gasket and giving a tight seal. At the same time, the leaf spring 7 is compressed and urges the two plugs 8–9 which close the bores 10–11 of the lid and act as safety valves.

Said plugs 8 and 9 have a head (8–9) whose diameter exceeds the diameter of the bores 10–11, a cylindrical shank (15–15') whose diameter is smaller than that of the bores aforementioned, and an enlarged end 16–16' whose diameter is larger: the enlarged end, however, is multifaceted so as to leave gaps such as 17–17' (18–18') between the edge of the bores 10–11 and the plugs. FIGURES 4, 5 and 6 will clearly show the operability of said plugs.

When the cooker is lidded, and before steam has reached the preselected pressure, each plug closes with its head 8 the bore 10 and keeps it closed under the bias of the spring 7 (FIG. 4). As the steam pressure attains the preselected limiting value, the plug tends to be lifted, but, under the conflicting urges of the spring and the steam pressure, it takes an intermediate position as shown in FIG. 5: in this position, neither the head 8 nor the enlargement 16 contact the lid and steam can be vented freely by flowing around the shank, since the whole annular cross-sectional area between the shank 15 and the edge of the bore 10 is freely available. As the user lifts the manipulating lever to start opening, the bias of the spring 7 is done away with, and the residual steam pressure urges the plug until causing the enlarged end 16 to contact the edge of the bore so that the passageway for venting steam is reduced to the lateral gaps 17–17' only. By so doing, the detrimental action of steam on the user's hands is avoided, should the user not wait long enough before the complete discharge of steam before opening the cooker.

It should be noticed that in each plug the opposite ends of the plug head and of the enlarged end have the same pointed shape for giving a rest point to the spring. This is made purposely: if the user removes the plug from the bore and replaces it incorrectly by inadvertency, when the lever is depressed, the enlarged end would adhere to the bore edge and the user would soon notice that the cooker is not under presure as steam would continue to flow out through the gaps 17–17'.

It should be noticed, also, that the leaf spring 7 is calculated so as to work, when in its closed position (FIG. 2) in the neighbourhood of the yield point, so as to avoid that, due to the accidental or wilful deformation of its shape after the correct assemblage in the factory, the pressure exerted by the plugs may become excessive and thus higher than the preselected safety limit.

It should be noticed, lastly, that the lid 2, due to its substantially planar configuration and its thickness, acts like the movable wall of a manometric capsule, whose deformation as a function of the pressure, can be signalled to the outside.

In the example illustrated herein, said signalling is obtained through the manipulating lever itself: the latter, due to its bellcrank configuration, is positioned with its arm 12 overhanging in a horizontal position parally to the lid but still spaced apart therefrom. As the pressure in the interior of the cooker is increased, and so is also the resilient deformation of the lid, the central portion of the lid tends to be lifted, and the stirrup is lifted therewith, thus permitting that the lever may be rotated about its pivot due to the weight of the arm 12 or to a slight manual pressure applied for control purposes.

What is claimed is:

1. A pressure cooker comprising a cooker body and a lid, sealing means cooperatively disposed for providing a circumferential seal between said cooker body and said lid, valve means disposed within said lid, resilient means disposed in overlying relationship to said valve means, a cross-beam disposed above said cooker body, and force applying means for forcing said cross-beam into engagement with said cooker body and for forcing said resilient means into engagement with said valve means.

2. A pressure cooker as defined in claim 1 wherein said resilient means is a leaf spring having a central portion and free ends, said valve means comprising a plurality of plugs each disposed within a respective bore in said lid, said leaf spring having said central portion disposed for engagement with said cross-beam and said free ends disposed for engagement with said plugs.

3. A pressure cooker as defined in claim 2 wherein said plugs have a portion thereof smaller than said respective bore for providing vent means when pressure on said plugs overcomes the resilience of said leaf spring.

4. A pressure cooker as defined in claim 1 wherein said lid is resiliently deformable, and signal means cooperating with said lid for signalling pressure within said pressure cooker.

5. A pressure cooker as defined in claim 4, said signal means including said force applying means and being comprised of a lever, and stirrup means connected between said lever and said lid for varying the position of said lever in accordance with pressure deformation of said lid.

6. A pressure cooker as defined in claim 1 wherein said lid is an oval lid, an inturned flange on said cooker body, said oval lid being disposable within said cooker body, said sealing means being disposed above said lid and below said inturned flange.

References Cited

UNITED STATES PATENTS

| 1,844,970 | 2/1932 | Muller et al. | |
| 2,337,046 | 12/1943 | Howard | 220—44 |
| 2,538,661 | 1/1951 | Vischer | 220—25 X |

FOREIGN PATENTS 1,011,266  6/1957  Germany.

JOSEPH R. LECLAIR, Primary Examiner

U.S. Cl. X.R.

220—44